US005765975A

United States Patent [19]

Hoffmann et al.

[11] Patent Number: 5,765,975
[45] Date of Patent: Jun. 16, 1998

[54] COMPLIANT END EFFECTOR FOR AN INDUSTRIAL ROBOT

[75] Inventors: James A. Hoffmann, Grandview; Douglas L. St. Onge, Milwaukee, both of Wis.

[73] Assignee: ABB Flexible Automation, Inc., New Berlin, Wis.

[21] Appl. No.: 708,719

[22] Filed: Sep. 5, 1996

[51] Int. Cl.⁶ ..................................... B23C 3/00
[52] U.S. Cl. .................. 409/138; 408/95; 408/236; 409/201; 901/41
[58] Field of Search .................. 408/77, 78, 95, 408/98, 234, 236, 237; 409/138, 175, 180, 201, 235; 901/30, 41, 42

[56] References Cited

U.S. PATENT DOCUMENTS

| | | | |
|---|---|---|---|
| 4,243,923 | 1/1981 | Whitney et al. | 318/561 |
| 4,447,048 | 5/1984 | Fischer | 267/141.1 |
| 4,598,456 | 7/1986 | McConnell | 29/407 |
| 4,603,284 | 7/1986 | Perzley | 318/568 |
| 4,637,775 | 1/1987 | Kato | 409/138 |
| 4,718,798 | 1/1988 | Dumargue et al. | 901/41 |
| 4,860,215 | 8/1989 | Seraji | 364/513 |
| 4,926,345 | 5/1990 | Novak et al. | 364/513 |
| 4,974,210 | 11/1990 | Lee et al. | 364/513 |
| 5,023,533 | 6/1991 | Ishikawa et al. | 318/568.21 |
| 5,023,808 | 6/1991 | Seraji | 364/513 |
| 5,165,829 | 11/1992 | Ross et al. | 901/41 |
| 5,206,930 | 4/1993 | Ishikawa et al. | 395/95 |

FOREIGN PATENT DOCUMENTS

| | | | |
|---|---|---|---|
| 149176 | 7/1981 | German Dem. Rep. | 408/236 |
| 3213550 | 11/1982 | Germany | 409/138 |
| 3713056 | 10/1987 | Germany | 901/41 |

*Primary Examiner*—Daniel W. Howell
*Attorney, Agent, or Firm*—Godfrey & Kahn, S.C.

[57] ABSTRACT

A compliant end effector particularly suited for use with a robotic arm for accurately cutting and trimming the edges of a hot molded sheet of flexible plastic. The compliant end effector includes a mount secured to the robotic arm, an adjustment assembly pivotally attached to the mount, a guide that engages the plastic sheet near the area to be cut and trimmed, a tool for cutting and trimming the flexible sheet, and a pneumatic cylinder that biases the guide into engagement with the flexible sheet and presses the sheet against a rigid surface. The pneumatic cylinder moves the guide and tool through a range of positions as the robotic arm moves along a single path of travel down the length of the flexible sheet. The guide remains in contact with the flexible sheet despite warping or other imperfections in the stabilizing surface. The tool is fixed a predetermined distance from the guide to ensure that the plastic sheet is cut and trimmed within specific tolerances. By rotating the end effector, tabs and recesses can be formed in the edge of the flexible sheet while the robot moves along its single path of travel.

36 Claims, 7 Drawing Sheets

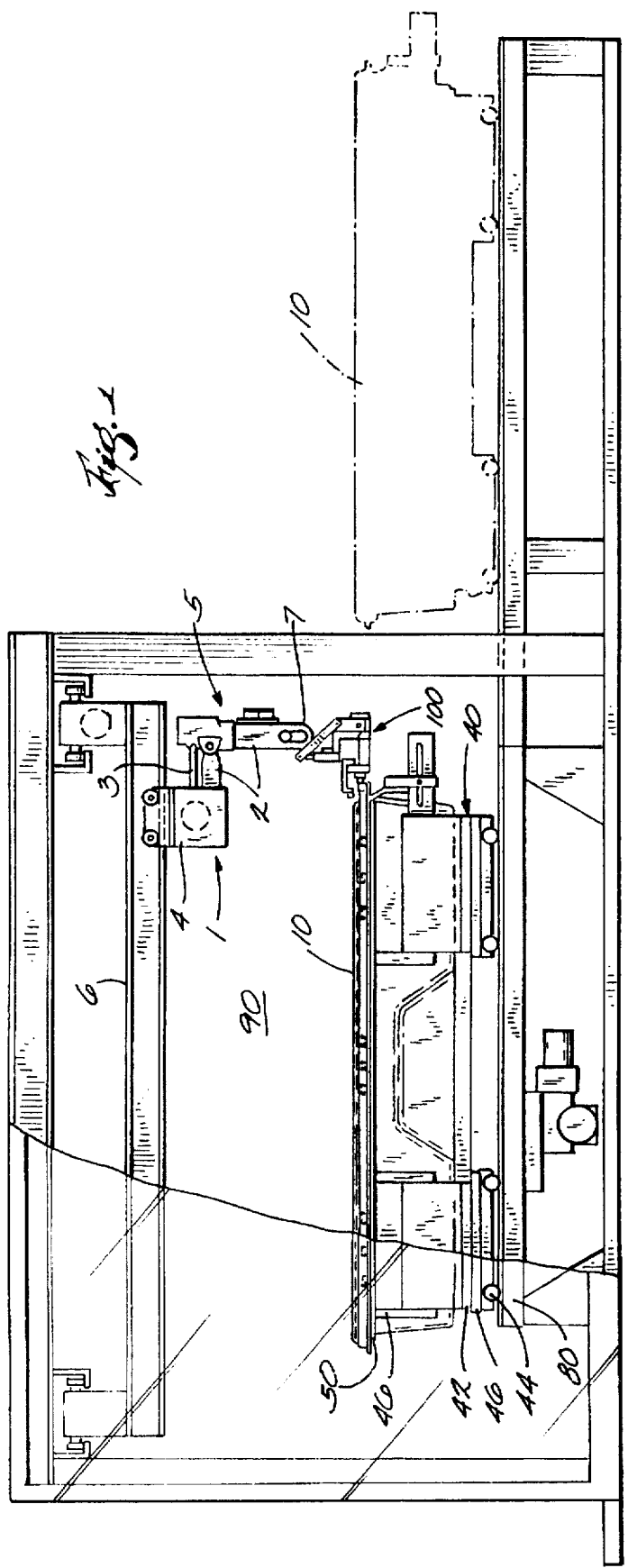

Fig. 4

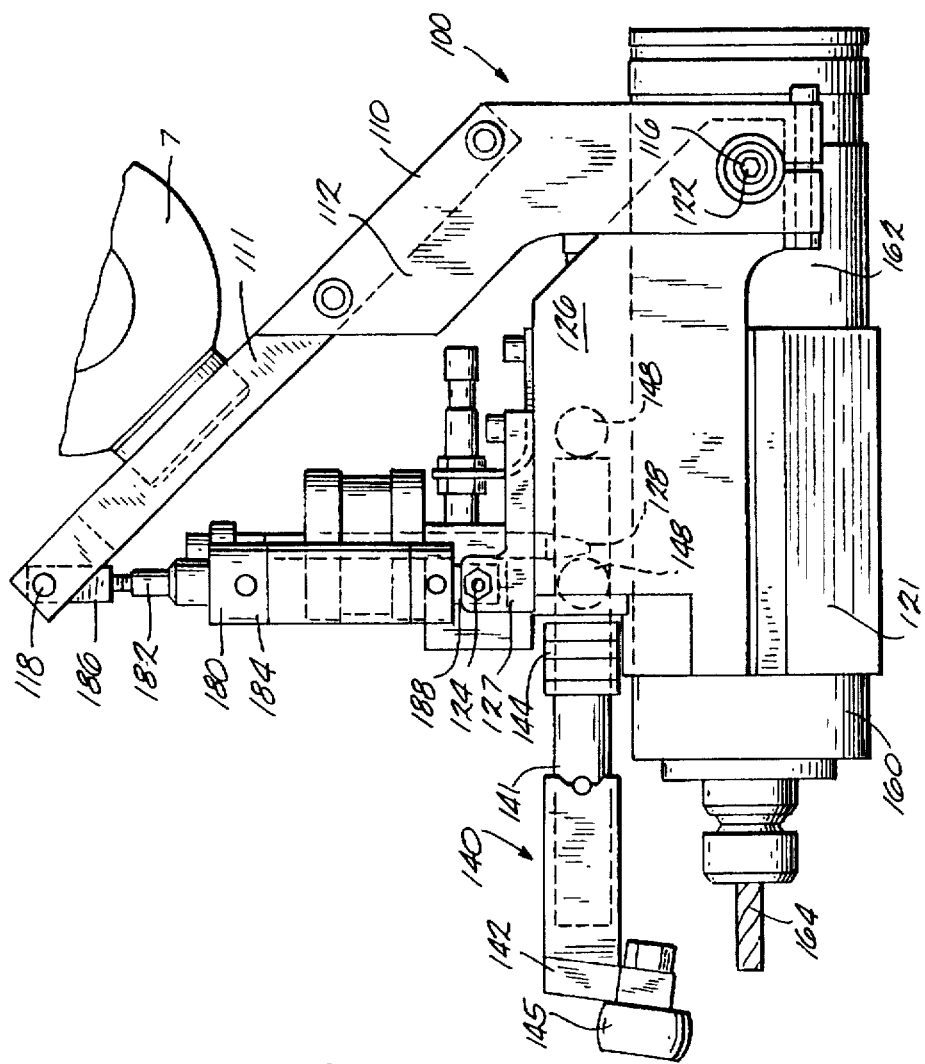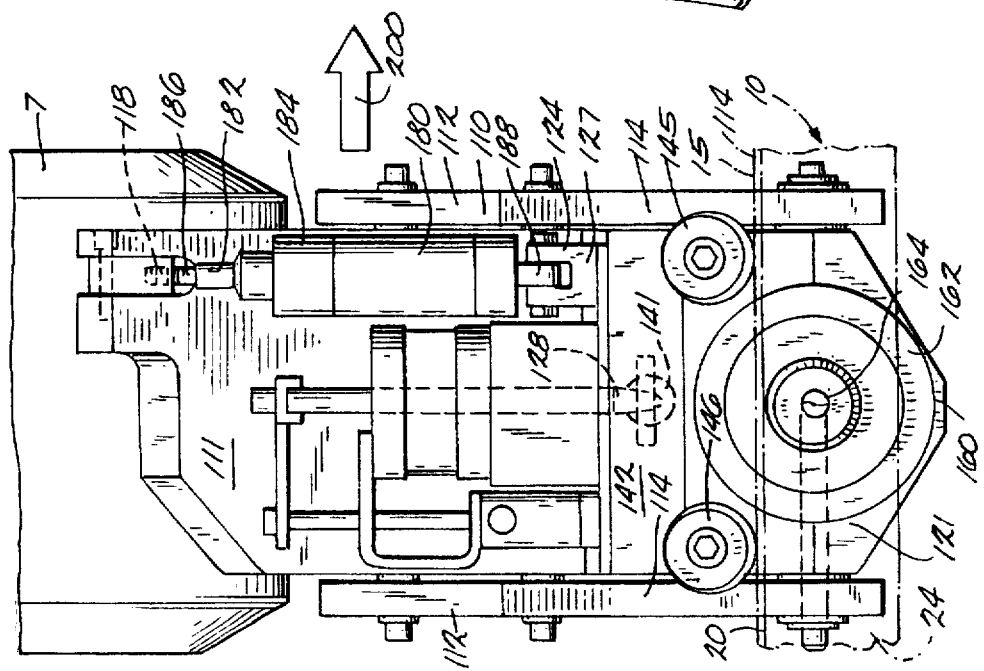

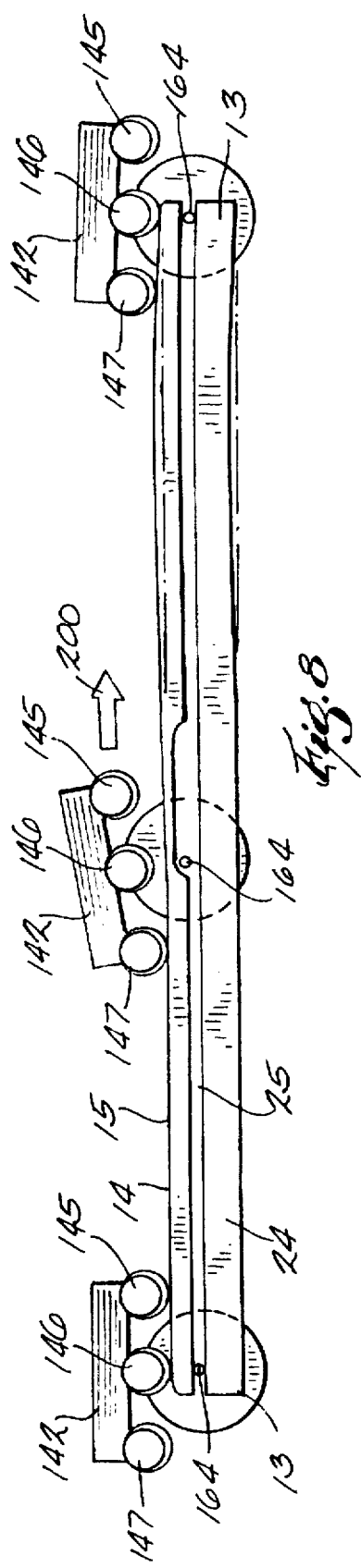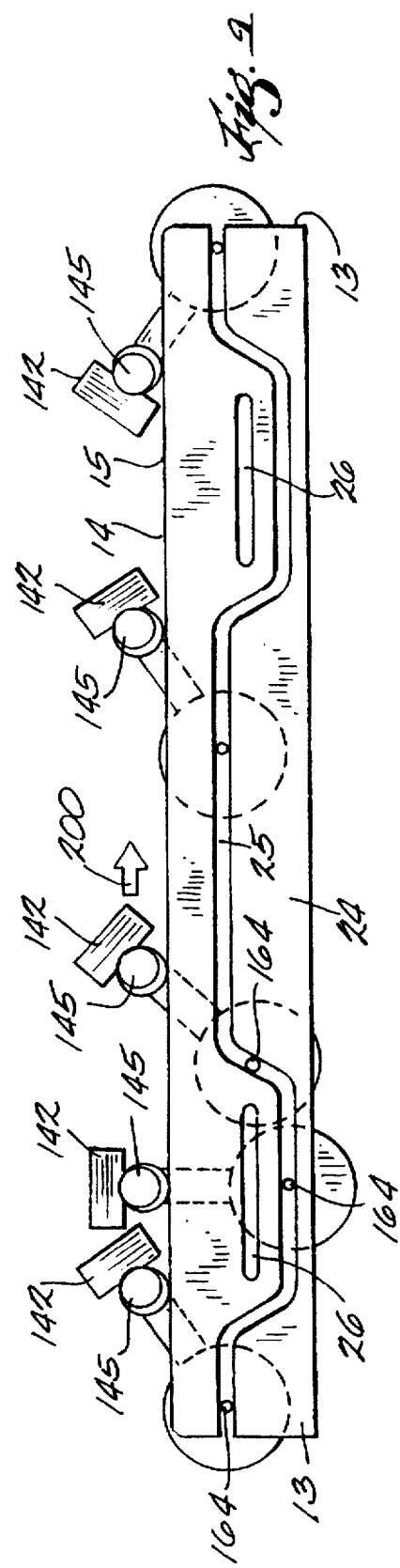

COMPLIANT END EFFECTOR FOR AN INDUSTRIAL ROBOT

TECHNICAL FIELD

The present invention relates to an industrial robot and compliant end effector therefor, and more particularly to a compliant end effector for roboticly cutting and trimming a flexible material, such as a sheet of hot molded plastic.

BACKGROUND

Many industries use robotics to speed up manufacturing, improve product quality, reduce costs, and provide a safer working environment for employees. Rigid parts can be roboticly worked by securing them to a work station so that the part is located at specific coordinates. The robot is then programmed to move along a predetermined path of travel, and to rotate, twist and turn at prescribed points along that path so that the robot performs the same tasks at the same places on each part passing through the work station. Such robotic work stations process parts quickly and manufacture them to relatively high degree of tolerances.

Problems arise with robotics when the parts being produced are made of a flexible material. Robotic machines do not readily take into consideration the variables associated with flexible parts. Flexible parts bend and vibrate when the tool engages them, which results in imprecision and flaws in the finished product. Although attempts have been made to program robots with feedback loops to accommodate for the variables associated with flexible parts, to date, such attempts have proved commercially unsuccessful in many manufacturing applications. For example, robots used to cut and trim the edges of flexible hot molded plastic sheets either perform too slowly or the edges of the parts are cut and trimmed inconsistently.

Additional problems arise when flexible parts are secured against a rigid surface or fixture prior to engaging the robotic tool. The flexible parts tend to take the shape of the surface of the fixture, including any imperfection in the shape of the fixture. These imperfections are then passed on to the finished part. This problem is compounded if the fixture is subject to harsh treatment do to its close proximity to the robotic tool. The fixture may need to be frequently replaced if struck by the robot or tool. This can dramatically increase the cost of the manufacturing process and the finished product. Yet, fixtures made of inexpensive components tend to have significant imperfections in their shape. For example, low cost iron and aluminum beams frequently have significant warping along the length of the beam.

A still further problem is that the stiffness or flexibility of the parts being manufactured may differ from part to part. For example, a sheet of hot molded plastic has different flexibility characteristics depending on the thickness of the sheet and how long it has been cooling since it was molded. Variations in sheet thickness as well as slow downs and shut downs in a work station can cause substantial changes in the stiffness of the plastic sheet. In some situations, the robotic arm may not be capable of supplying a sufficient force to push the flexible part against the fixture. This can result in inconsistencies in the parts because they are located at different coordinates during manufacture.

A still further problem arises when a part is mounted on a moving work station. This situation is common when a manufacturing process is done in an enclosed work station away from employees. The part is placed on a fixture mounted on a chassis and guide track and moved into an enclosed environment where work is performed. This adds to the difficulty in ensuring that the part is located at specific coordinates when work is performed by the robot. The fixture and chassis track may not move to exactly the same position on the guide track each time due to the design tolerances of the guide track, or due to dirt or other debris landing on the guide track. Variations in the location of the fixture are then passed on to the roboticly manufactured part.

A still further problem with robotics occurs when a part has a non-linear shape. For example, a plastic liner for a truck bed will frequently have tabs and recesses cut into its outer edge that secure the liner to the truck. The cutting and trimming tool cannot travel in a single linear path down the length of the liner when forming the tabs and recesses in the edge of the liner. Instead, the robotic arm is programmed to move from one linear path to another and back again. Each change in path of the robotic arm can cause imprecision in the finished part due to the tolerances associated with the movements of the robotic arm.

A still further problem arises in designing a robotic end effector that can automatically receive and release different tools during a manufacturing process. For example, to minimize the number of work stations needed to manufacture a product such as a plastic truck bed liner, a single robot may need to pick up, work with and put down different cutting, trimming and drilling tools. Otherwise, the product price will have to include the cost of several work stations.

A still further problem arises in designing a robotic end effector adapted for use in manufacturing a variety of differently shaped parts. As assembly lines are frequently intended to accommodate slight variations in part shape, the end effector must likewise be capable of adapting to these changes in part shape.

A still further problem arises in designing a robotic end effector that is easily adaptable for use on an existing robotic arm. The fewer modifications to the robotic arm that are necessary, the less costly and more easily the end effector will be incorporated into existing robot designs.

The present invention is provided to solve these and other problems.

SUMMARY OF THE INVENTION

The present invention relates to a compliant end effector that is particularly suited for use with a robotic arm for accurately cutting and trimming the edges of a hot molded sheet of flexible plastic. The compliant end effector includes a mount secured to the robotic arm, an adjustment assembly pivotally attached to the mount, a guide that engages the plastic sheet near the area to be cut and trimmed, a tool for cutting and trimming the flexible sheet, and a pneumatic cylinder that biases the guide into engagement with the flexible sheet and presses the sheet against a rigid surface. The pneumatic cylinder allows the guide and tool to move through a range of positions as the robotic arm travels along a single linear path of travel down the length of the flexible sheet. The guide remains in contact with the flexible sheet despite warping or other imperfections in the rigid surface that stabilizes the flexible sheet. The tool is fixed a predetermined distance from the guide to ensure that the plastic sheet is cut and trimmed within specific tolerances. By rotating the end effector, tabs and recesses can be formed in the edge of the flexible sheet while the robot moves along its single linear path of travel.

A main advantage of the present compliant end effector invention is that it enables a robot to accommodate the variables associated with the manufacture of flexible parts without the need of programming feedback loops. The compliant end effector helps secure the flexible parts against a stabilizing surface, and automatically adjusts the tool to the specific coordinates of the piece being worked, thus improving the precision of the robot and the quality of the finished product.

Another significant advantage of the compliant end effector is that it compensates for imperfections in the shape of the stabilizing surface or fixture against which the flexible part is secured. This enables the robotic manufacturing system to use inexpensive and readily available materials, such as a length of angel iron, to form the stabilizing fixture, even though these materials are not machined to a high degree of precision. This is particularly useful when certain components in the stabilizing fixture are subjected to harsh treatment during the robotic manufacturing process and need to be replaced frequently.

A further advantage of the present compliant end effector invention is that it adapts to the varying degrees of stiffness or flexibility of the part being manufactured, thereby improving the quality of the finished product. For example, the invention compensates for the varying flexibility of a sheet of hot molded plastic as it cools down. This adaptability enables the robot to be used in assembly lines that experience periodic slow downs and shut downs in production.

A further advantage of the present compliant end effector is that it compensates for variations in the position of the flexible material even when the edge of the part being worked is not pressed directly against a stabilizing surface or fixture. This is significant when the robotic arm is not intended to or is not capable of supplying a sufficient force to press the flexible part against the stabilizing surface every time. This can occur when an assembly line shut down or slow down causes a hot molded sheet of plastic to cool and become too stiff. The robotic arm cannot press the end of the sheet against the fixture as the arm moves along the length of the sheet.

A still further advantage of the present compliant end effector invention is that it compensates for variations in part placement caused when the part is secured to a fixture and chassis that moves on a guide track. Such a situation can occur when the part is manufactured in an enclosed environment away from employees. The part is placed on the fixture and chassis by an employee and moved along the guide track into an enclosed work station for processing. The invention enables the robotic arm to align the working end of its tool with the specific coordinates of the part being manufactured. The guide track need not move the part to exactly the same vertical or horizontal coordinates each time. The end effector compensates for the physical limitations of the guide track, as well as for any dirt or other debris landing on the guide track, so that a consistent product is produced.

A still further advantage of the present invention is that it enables the robot to move along a single linear path of travel, even when the part being manufactured has a non-linear shape. For example, the invention is capable of cutting and trimming tabs and recesses into the outer edge of a plastic liner. The end effector can be rotated to move the cutting or trimming tool closer to or further away from the a reference point or reference line on the surface of the liner. This rotational movement enables the robot to quickly and precisely cut and trim various shapes into the edge of the liner.

A still further advantage of the present invention is that it enables a robot to release its guiding component, and replace it with a tool such as a drill. The end effector's ability to grip a variety of tools and perform a variety of manufacturing processes at a single work station improves manufacturing efficiencies and reduces the cost of the finished product.

A still further advantage of the present compliant end effector invention is that it is adaptable for use on a variety of differently shaped parts. This enables a single work station to accommodate differently shape parts without replacing the end effector and completely reprogramming the robot.

A still further advantage of the present compliant end effector invention is that it is easily adaptable for use on a variety of existing robotic arms. Few modifications are necessary so that it can be easily and inexpensively incorporated into many existing robot designs.

Other features and advantages of the invention will be apparent from the following specification taken in conjunction with the noted drawings.

BRIEF DESCRIPTION OF DRAWINGS

FIG. 1 is a side plane view of the present compliant end effector invention installed on the end of a robotic arm cutting the edges of a molded plastic liner placed on a stabilizing fixture supported by a guide track that moves the liner in and out of a confined work space.

FIG. 4 is a side elevational view of the compliant end effector mounted on a robotic arm with a pneumatic cylinder in a fully extended position so that the guide and tool are in a first biased position.

FIG. 6 is a front view of the compliant end effector having two guide rollers engaging the surface of the flexible liner while the working end of the tool cuts the liner a specific distance from the engaged surface of the liner as the robot moves along a single linear path of travel.

FIG. 7 is a side elevational view of FIG. 6 of the end effector showing the multi-ball shaped tripod of the guide and the locking pin in phantom.

FIG. 8 is a schematic elevational view of the compliant end effector having three guide rollers at least one of which is engaging the surface of the liner, and with the guide and tool assembly rotated at specific angles at predetermined locations so that the tool moves closer to the engaged surface of the liner to form recesses in the liner as the robot moves along a single linear path of travel.

FIG. 9 is a schematic plan view of the compliant end effector having one guide roller engaging the surface of the liner, and with the guide and tool assembly rotated at specific angles at a predetermined location so that the tool moves away from the engaged surface of the liner to form tabs in the liner as the robot moves along a single linear path of travel.

FIG. 10 is a top view of the guide with two rollers and a multi-ball shaped end.

DETAILED DESCRIPTION

Figure 11:
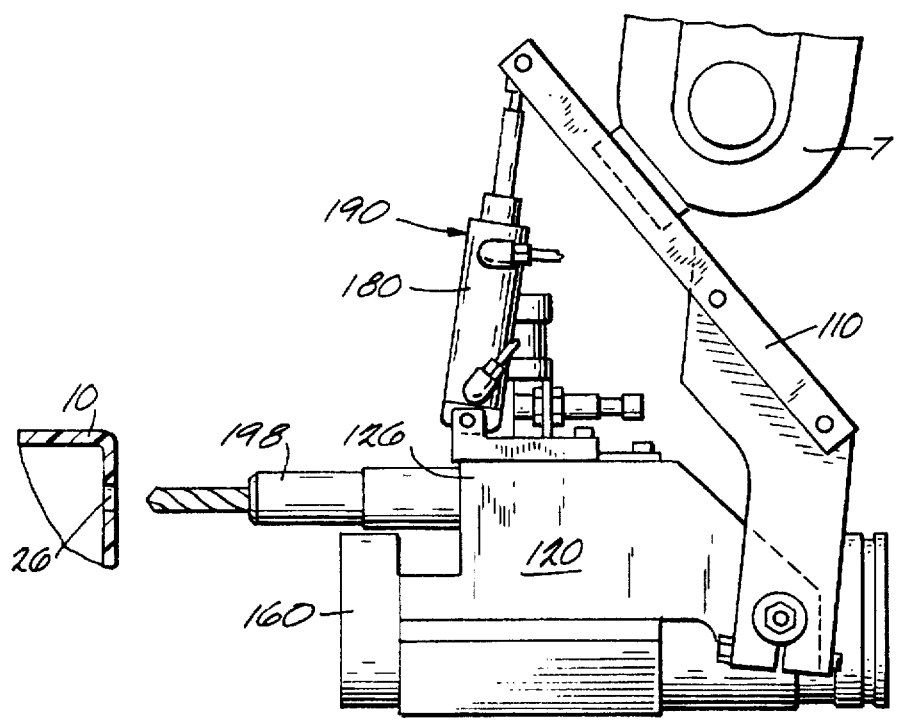
FIG. 11 is a side elevational view of the end effector equipped with an air drill in place of the guide.

While this invention is susceptible of embodiments in many different forms, there is shown in the drawings and will herein be described in detail, a preferred embodiment of the invention with the understanding that the present disclosure is to be considered an exemplification of the principles of the invention and is not intended to limit the broad aspects of the invention to the embodiment illustrated.

Figure 2:
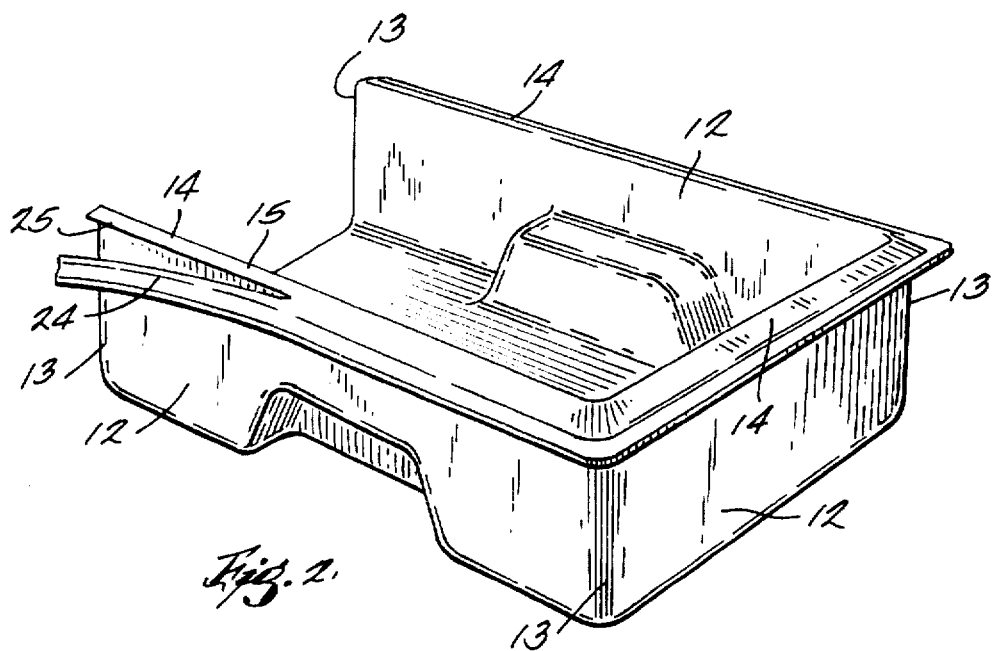
FIG. 2 is a perspective view of a hot molded, plastic truck bed liner showing a portion of its excess edge material cut away.

The invention relates to a compliant end effector for an industrial robot 1, having a body 4, which may include an articulated arm 5. The arm 5 is formed by a plurality of segments 2 pivotably connected together in adjacent relationship, and motors or other actuators 3 for pivoting each segment with respect to each adjacent segment. Although any suitable support may be used, in the embodiment shown in FIG. 1, the robot 1 is suspended from and moves along a beam 6 supported by the ceiling of a room. The robotic arm 5 has a proximal end 7 equipped with a compliant end effector 100 for working on a part or work piece 10 located below the robotic arm 5. The end effector 100 is shown constructed in accordance with a preferred embodiment of the invention. The end effector 100 is particularly suited for machining hot molded sheets of plastic such as the truck bed liner 10 shown in FIG. 2. The truck bed liner has walls 12 of a given length defined by ends 13, and a given height defined by an upper rim 14. The rim 14 has upper and lower surfaces 15 and 16, inner and outer portions 18 and 19, and a downwardly extending lip 20. As discussed in more detail below, the end effector 100 engages a predetermined location 22 on the upper surface 15 of the rim 14 prior to cutting excess material 24 from the lip 20 and forming the desired edge 25 of the liner 10.

Figure 3:
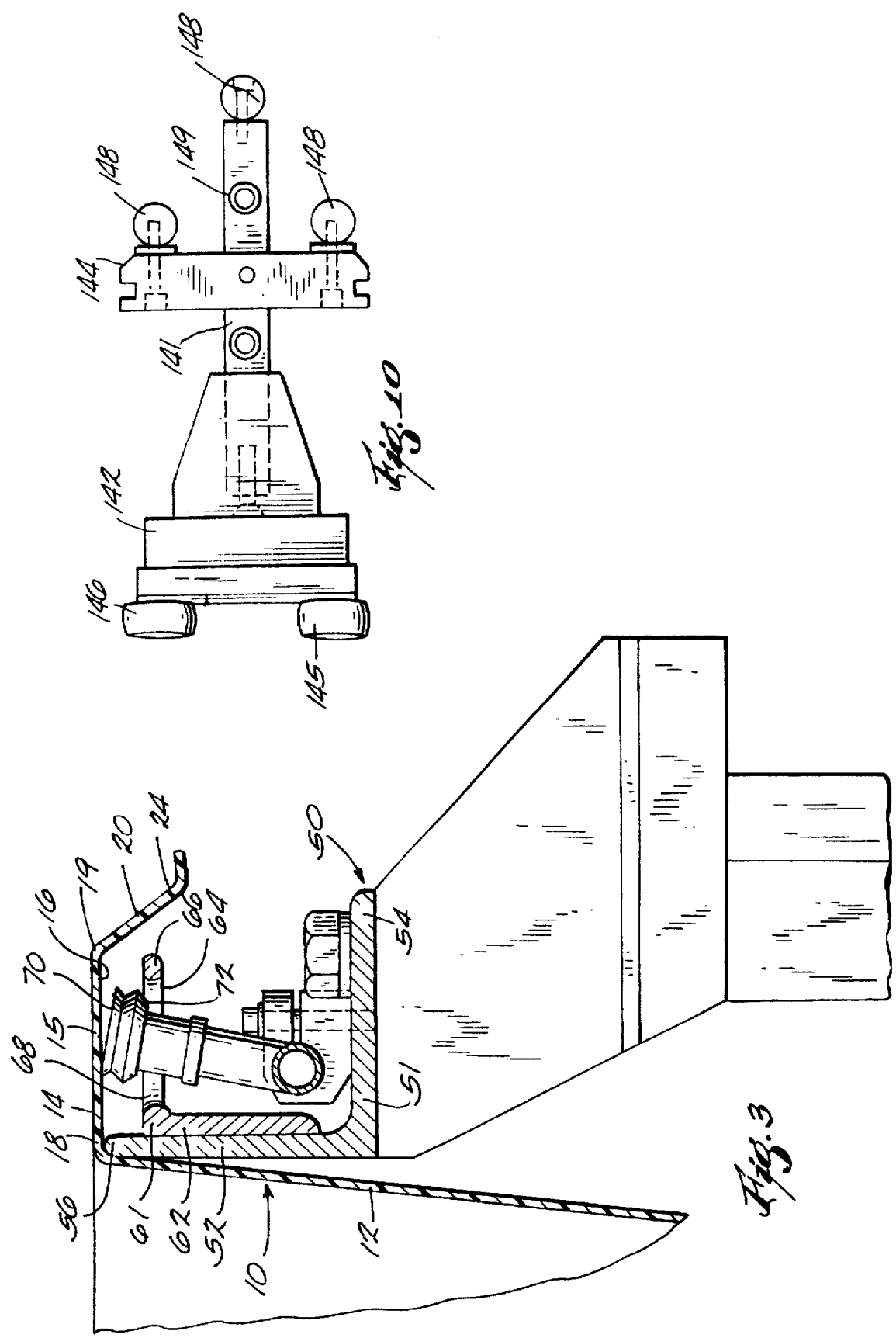
FIG. 3 is a partial side sectional view of the stabilizing fixture with a shoulder of a first angle supporting an inner portion of an upper lip of the liner and a shoulder of a second angle positioned beneath an outer portion of the upper lip of the liner.

As shown in FIG. 3, the liner is placed on a stabilizing fixture 40 having a chassis 42 with wheels 44 and a plurality of upwardly projecting posts 46 that support an upper frame 50. The components forming the stabilizing fixture are robustly sized to maintain their shape under load. The upper frame 50 defines a platform for supporting, aligning and stabilizing the work piece 10. The frame 50 includes a bracket 48 and a at least one set of angles 51 and 61 for each wall 12 of the liner 10. One set of angles 51 and 61 extends substantially parallel to each wall 12. The frame 50 forms a roughly horizontal plane for supporting the rim 14 of the liner 10.

Each set of angles includes a first or larger angle 51 and a second or smaller angle 61. The first or larger angle 51 has a first upwardly extending flange 52 and a second outwardly extending flange 54. The outwardly extending flange 54 is bolted to bracket 48. The upwardly extending flange 52 extends a predetermined distance above bracket 48 and has a free end that forms a first shoulder 56. The shoulder 56 engages and supports the upper most portion of the lower surface 16 of the rim 14 of the liner 10. The size and shape of the frame 50 is adapted to the size and shape of the liner 10 so that the first shoulder 56 engages the inner portion 18 of the rim 14. This aligns the rim 14 of each wall 12 on the frame 50 at a desired position with respect to the robot 5.

The second or smaller angle 61 has an downwardly extending flange 62 and an outwardly extending flange 64. The downwardly extending flange 62 of the smaller angle 61 is nested in and bolted to the surface of the upwardly extending flange 52 of the larger angle 51. The outwardly extending flange 64 extends a predetermined distance and has a free end that forms a second shoulder 66. The second shoulder 66 is located at a position that enables the robot 5 to press the rim 14 of the liner 10 against the shoulder 66 during operation. The first and second shoulders 56 and 66 remain a predetermined distance apart and extend substantially parallel to the length of the wall 12 they support. Both the larger and smaller angles 51 and 61 are bolted in place for easy replacement if damaged during production. The angles 51 and 61 can be made of any inexpensive, commercially available material, such as iron, steel, aluminum, plastic, etc.

When initially placed on the stabilizing fixture 40, the inner portion 18 of the rim 14 rests on the first shoulder 56 of the larger angle 51. The flexible, hot molded plastic liner 10 maintains a certain degree of rigidity so that outer portion 19 of the rim 14 extends above the second shoulder 66 of the smaller angle 61. In this embodiment of the invention, the upwardly and downwardly extending flanges 52 and 62 are substantially vertical, and the outwardly projecting flanges 54 and 64 are substantially horizontal.

A number of vacuum cups 70 are mounted on the upper surface of the outwardly extending flange 54 of larger angle 51. The vacuum cups 70 project upwardly through a plurality of openings 68 in the outwardly extending flange 64 of the smaller angles 61. Each vacuum cup 70 has a bellowed vacuum supply tube 72. When the vacuum cups 70 engage and seal against the lower surface 16 of the rim 14 of the liner 10, the bellowed vacuum supply tubes 72 contract to help draw the rim down toward the shoulder 66 of flange 64.

Figure 4:
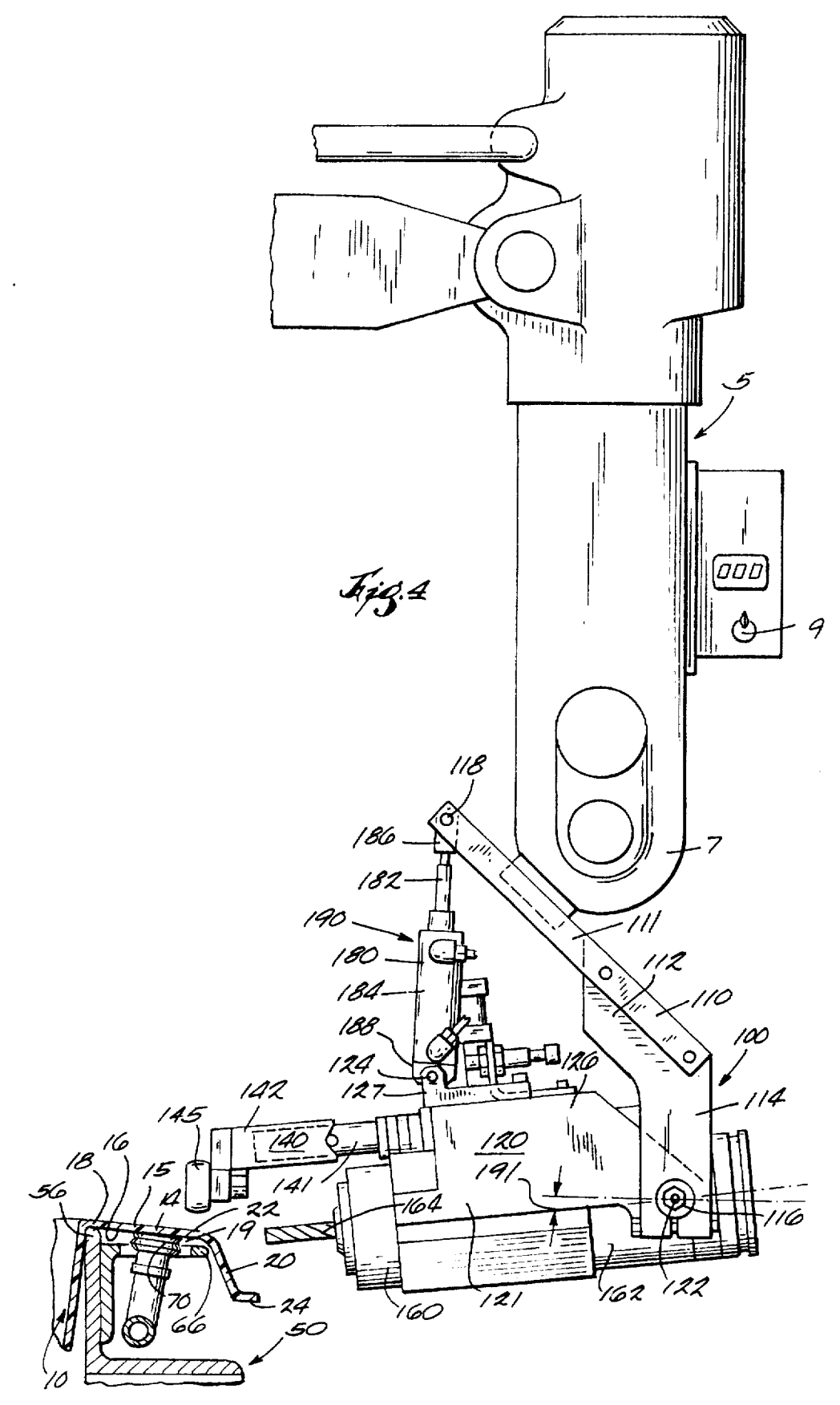

Referring again to FIG. 1, once the liner 10 is placed on the fixture 40, the fixture 40 slides along a guide track 80 into a confined work station 90. When in the work station 90, the first and second shoulders 56 and 66 of the upper frame 50 of the fixture 40 and the rim 14 of the liner 10 are roughly positioned at a horizontal level that is a given vertical height above the floor of the room. As shown in FIG. 4, vacuum pressure is now supplied to vacuum cups 70 which engage the lower surface 16 of the outer portion 19 of the rim 14 to help draw the rim down toward the second shoulder 44.

As generally shown in FIGS. 4–7, the end effector 100 includes a mount 110, an adjustment assembly 120, a guide 140, a tool 160 and biasing mechanism such as a pneumatic cylinder 180. Each of these components is preferably made of metal and robustly sized to maintain its shape under load.

The mount 110 includes a main body 111 that is rigidly secured to the end 7 of the robotic arm 5. The mount 110 further includes a bracket 112 with spaced apart legs 114 for receiving the adjustment assembly 120. Each leg 114 of the bracket 112 has a first location 116 for pivotally attaching the adjustment assembly 120. The main body 111 of the mount 110 has a second location 118 for pivotally attaching one end of the pneumatic cylinder 180. While this embodiment of the invention is shown and described as having the adjustment assembly 120 pivotally attached to end effector mount 110, it should be understood that other ways of attaching these components are possible without departing from the overall aspect of the invention.

The adjustment assembly 120 includes a casing 121 having a first point 122 pivotally attached to the first location 116 of the mount via a bolt, nut and washer assembly. A portion of the adjustment assembly casing 121 is shaped to matingly receive and securely support the tool 160. The round shape of the casing 121 smoothly engages the rounded surface of the tool 160. The adjustment assembly further includes a port 126 for receiving the guide 140 and a mount 127 for pivotally attaching the pneumatic cylinder 180 as discussed below. A locking pin 128 FIGS. 6–7 is included for releasably securing the guide 140 in the port 126 of the assembly 120.

As best shown in FIG. 10, the guide 140 includes a shaft 141 with a roller assembly 142 secured at one end and a tripod assembly 144 secured at the other end. The roller assembly 142 shown in FIGS. 4–7 and 10 includes a set of two rollers 145 and 146, but may include a single roller 145 as in FIG. 9 or three rollers 145–147 as in FIG. 8 depending on the manufacturing process being performed by the robot 1. Each roller or work piece engaging portion 145–147 revolves about an axis parallel to the length of the guide shaft 141.

The tripod assembly 144 is adapted to matingly fit into the port 126 of the adjustment assembly 120. Each leg of the tripod 144 includes a ball 148 which is firmly pinned to the tripod. The shaft 141 of the guide 140 has a hole 149 for receiving locking pin 128 to secure the guide 140 in port 126. The tripod shaped assembly 144 and locking pin 128 secure the guide 140 to the adjustment assembly 120 so that it does not rotate or slide in the port 126. When locked in place, the guide 140 projects from the assembly 120 in a predetermined direction and the rollers 145 and 146 extend a predetermined distance from the assembly.

The tool 160 includes a precision, high speed electric powered spindle 162 and a cutting or trimming tool bit 164. The adjustment assembly 120 holds the spindle 162 at a predetermined location so that the tool bit 164 projects from the assembly 120 in a predetermined direction and extends the bit 164 a predetermined distance from the assembly and the end 7 of the robotic arm 5. The guide 140 and tool 160 are rigidly fixed on the assembly 120 with respect to each other and project from the assembly in parallel directions. As best seen in FIG. 6, each guide roller 145 and 146 remains a constant predetermined distance from tool bit 164, even when the assembly 120 pivots about the first location 116 of the end effector mount 110.

The pneumatic cylinder 180 disclosed herein includes first and second telescoping tubes 182 and 184. The first tube 182 has an end 186 pivotally attached to the second location 118 of the mount 110. The second tube 184 has an end 188 pivotally attached to the second point 124 of the adjustment assembly 120. The first and second points 122 and 124 of assembly 120 are a predetermined distance apart. Tubes 182 and 184 hold a predetermined internal pressure when the cylinder 180 is in a fully extended position 190 as shown in FIG. 4. The internal pressure biases the tubes 182 and 184 toward this fully extended position 190, and thus biases the assembly 120, guide 140, guide rollers 145–147, tool 160 and tool bit 164 toward a first biased position 191. When in this first biased position 191, the guide 140 and tool 160 extend in a specific direction relative to the end 7 of the robotic arm 5 and the end effector mount 110.

Figure 5:
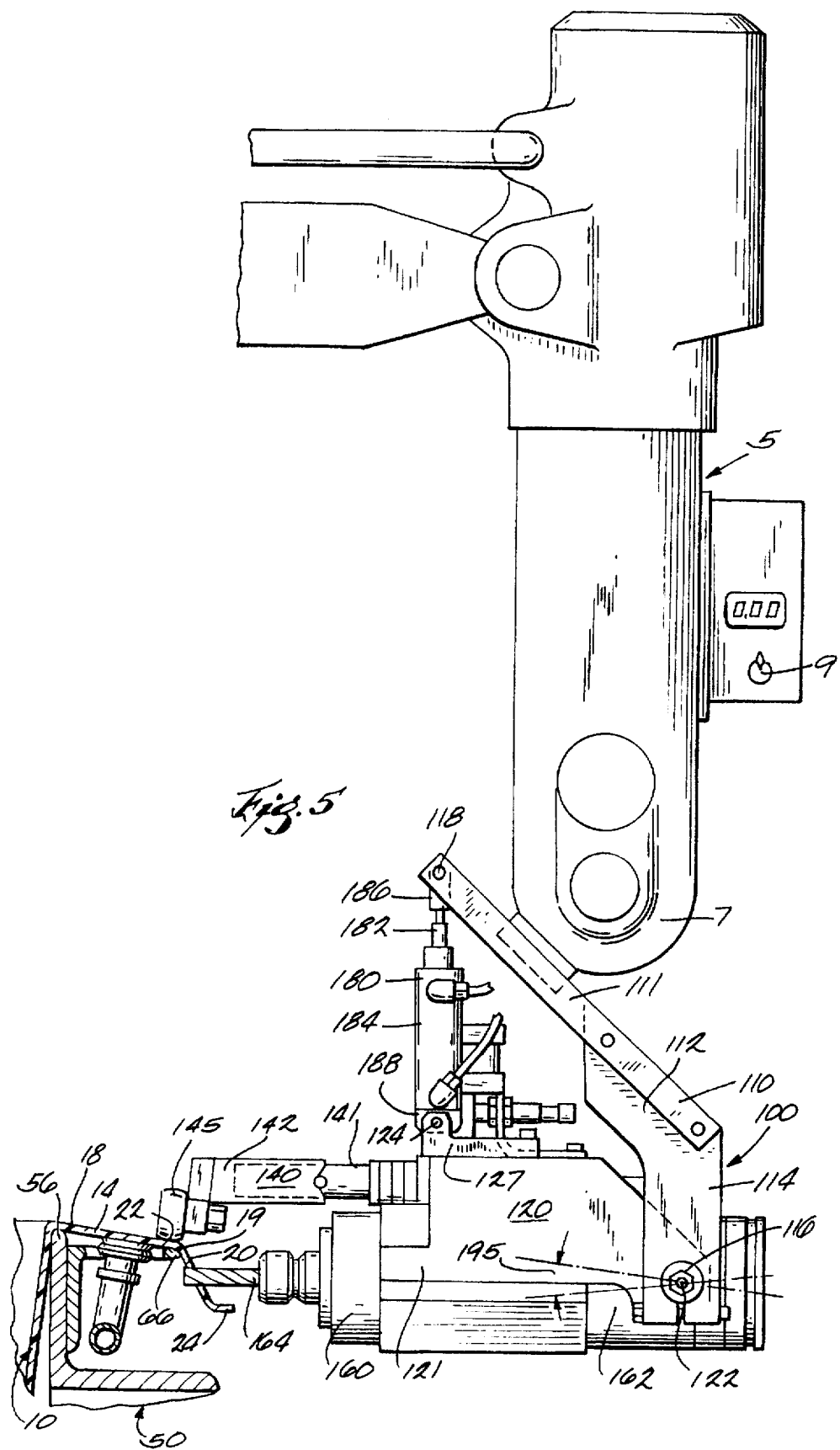
FIG. 5 is a side elevational view of the compliant end effector with a guide roller pressing the outer portion of the upper lip of the flexible liner against the second shoulder of the fixture and compressing the pneumatic cylinder so that the guide and tool are in a second biased position.

Programmed movement of the robotic arm 5, causes the guide rollers 145 and 146 to engage the predetermined location 22 on the upper surface 15 of the rim 14 of the liner 10. The end 7 of the robotic arm 5 moves vertically downward so that the rollers 145 and 146 press the liner 10 against the shoulder 66 of the second angle 61 of the upper frame 50 of fixture 40 as shown in FIG. 5. This compresses the telescoping cylinder 180 and pivots the adjustment assembly 120, guide 140 and tool 160 about assembly point 122 so that the guide rollers 145 and 146 and tool bit 164 can move through a range of positions 195. The robot 1 is provided with a pressure control valve 9 for regulating the internal pressure in cylinder 180. The greater the pressure in cylinder 180, the greater the force required to compress the cylinder to a given position. If the internal pressure is set too high, the downward movement of the end effector 100 may generate forces capable of deforming the fixture 40. If the internal pressure is set too low, the end effector may not generate enough force to push the liner 10 against the shoulder 66 of the fixture 40.

As best shown in FIGS. 6 and 7, the guide 140 is secured to the adjustment assembly 120 by locking pin 128. The locking pin 128 is biased toward a locked position by any suitable means such as pneumatic pressure supplied through the robotic arm 5. The robot 1 is programmed to release the pressure to the locking pin 128 when it moves to a specific location above a tool fixture (not shown). A biasing means, such as a spring (not shown) then biases the pin 128 out of engagement with guide shaft hole 149. The guide 140 then drops out of adjustment assembly port 126 and into the tool fixture. As shown in FIG. 11, a new tool such as an air drill 198 can be secured to the adjustment assembly 120 in place of guide 140. The robot 1 is adapted to supply a pressurized air flow to power the drill 198. The air drill 198 is equipped with a tripod assembly similar to that of the guide 140. The rounded shape of the balls 148 of the tripod assembly 144 facilitate the ability of the robotic arm 5 to align the assembly port 126 with the tripod assembly.

Operation

Although the operation of the end effector should be readily apparent from the above disclosure, the following is provided to further assist the reader.

The robotic manufacturing process is initiated by placing the hot molded truck bed liner 10 on fixture 40 and moving the fixture into a predetermined position in the work station 90 via the guide track 80 as in FIG. 3. Vacuum pressure is then applied to the vacuum cups 70 to stabilize the liner 10 and help draw the outer portion 19 of the rim 14 toward the shoulder 66 of the second angle 61 of the upper frame 50 of fixture 40 as in FIG. 4.

The robotic arm 5 then aligns the compliant end effector 100 so that one guide roller 145 is positioned over the end 13 of the liner wall 12 as shown at the left of FIGS. 4, 8 and 9. At this time, the tool bit 164 is positioned above and to the left of the end 13 of the liner 10. The cylinder 180 of the end effector 100 is in its fully extended position 190 so that the guide 140 and tool 160 are in the first biased position 191 as shown in FIG. 4.

The robotic arm 5 now lowers the end effector 100 so that the guide roller 145 presses against the outer portion 19 of the upper surface 15 of the rim 14 of the liner 10 at a predetermined location just inside of where the tool bit 164 is to engage the lip 20 of the liner 10. The robotic arm 5 continues to move the end effector downward to a predetermined vertical level with respect to the upper frame 50 of the fixture 40 and rim 14 of the liner 10. At this time, the guide roller 145 presses the liner 10 against the second shoulder 66 of the upper frame 50 as shown in FIG. 5. The cylinder 180 is preferably compressed to a midpoint in its range of compressed positions. This enables the guide rollers 145–147 to maintain contact with the upper surface 15 of the rim 14 of the liner 10 even if the fixture 40 and/or liner 10 move up or down with respect to the fixed vertical level of the end 7 of the robotic arm 5 and end effector mount 110.

The robot 1 now begins to move in a single linear path of travel 200 substantially parallel to the length of the liner 10 as shown in FIG. 6–9. The linear path of travel 200 is also substantially parallel to the length of angles 51 and 61 and their respective shoulders 56 and 66. The tool bit 164 engages the lip 20 of the liner 10 a predetermined distance below the point 22 where the guide roller 164 engages the upper surface 15 of the rim 14 of the liner 10, and begins to cut away the excess liner material 24. As the robot 1 moves along the length of the liner 5, deviations in the vertical height of the rim 14 of the liner 10 caused by warping in the fixture 40 or imperfections in the guide track 80 are compensated for by the adjustment assembly 120 and cylinder 180 so that the guide rollers 145–147 remain in contact with the upper surface 15 of the rim 14 of the liner 10.

Once the excess material 24 has been cut from the liner 10, the robot 1 can either replace the cutting tool 164 with a special trimming tool, or continue to use the cutting tool but reduce the rotations per minute of the spindle 162 to effectuate a smoother trimming cut. The robot 1 then repeats the above movements, but moves along its path of travel 200 at a reduced rate of speed to trim a smooth edge 25 in the lip 20 of the liner 10 at the predetermined distance from the upper surface 15 of the rim 14 of the liner 10.

As shown in FIGS. 8 and 9, the robotic arm 5 can rotate the end effector 100 so that one of the rollers 145–147 remains in contact with the upper surface 15 of the rim 14 of the liner 10 and the tool bit 164 moves closer to or further away from the upper surface 15 of the liner 10. This rotation of the end effector 100 enables the robot 1 to cut tabs and recesses into the edge 18 of the liner 10 while the robot 1 travels in a single linear and horizontal path of travel 200 along the length of the liner 10.

Once the cutting and trimming of the liner 10 is complete, the robot 1 may move to the tool fixture and release the air pressure to locking pin 128 so that the guide 140 drops into a predetermined location in the tool fixture. The robotic arm 5 then positions the adjustment assembly port 126 over the air drill 198 stored in a specific location in the tool fixture. The robotic arm 5 then moves to engage the assembly port 126 with the tripod assembly of the air drill 198, and reactivates the air pressure to locking pin 128 to secure the air drill. Holes 26 can now be drilled into the liner 10 at predetermined locations as shown in FIGS. 8, 9 and 11. The robot 1 then returns to a home position, the truck bed liner 10 is removed from the work station 90 via the guide track 80, the finished liner 10 is removed and replaced with an unfinished liner 10, and the manufacturing process is repeated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A compliant end effector attachable to a robot for performing work on a work piece, said compliant end effector comprising:

an adjustment assembly movably attachable to the robot;

a guide having a predetermined length and extending from said adjustment assembly in a predetermined direction, said guide having a work piece engaging portion for engaging the work piece at a predetermined location;

a tool having a predetermined length and extending from said adjustment assembly in a predetermined direction, said tool having a working end for engaging the work piece a predetermined distance from said location where said work piece engaging portion of said guide engages said work piece; and, a biasing mechanism for biasing said guide toward a first biased position, said biasing mechanism permitting said guide to move through a range of biased positions when engaging the work piece, said biasing mechanism causing said work piece engaging portion of said guide to remain in contact with the work piece.

2. The compliant end effector of claim 1, and wherein the guide and tool are rigidly fixed to said adjustment assembly and said working end of said tool remains a constant predetermined distance from said work piece engaging portion of said guide.

3. The compliant end effector of claim 2, and wherein the work piece has a predetermined length and the robot is programmed to move along a predetermined path of travel along the length of the work piece, and said biasing mechanism biases said guide against the work piece as the robot moves along said predetermined path of travel and said tool continues to engage the work piece a predetermined distance from said work piece engaging portion of said guide.

4. The compliant end effector of claim 3, and wherein said mechanism biases said work engaging portion of said guide into a first predetermined position prior to engagement with the work piece.

5. The compliant end effector of claim 1, and further comprising a mount rigidly secured to the robot, said mount having a first location, and said adjustment assembly having a first point movably attached to said first location of said mount.

6. An industrial robot for performing work on a work piece, said robot comprising:

a body;

an adjustment assembly movably attached to said body;

a guide having a predetermined length and extending from said adjustment assembly in a predetermined direction, said guide having a work piece engaging portion that engages the work piece at a predetermined location;

a tool having a predetermined length and extending from said adjustment assembly in a predetermined direction, said tool having a working end that engages the work piece a predetermined distance from said location where said work piece engaging portion of said guide engages said work piece; and, a biasing mechanism that biases said guide toward a first biased position, said biasing mechanism permitting said guide to move through a range of biased positions when engaging the work piece, said biasing mechanism causing said work piece engaging portion of said guide to remain in contact with the work piece.

7. The compliant end effector of claim 1, wherein the workpiece is flexible, and wherein the flexible work piece is placed proximal a stabilizing fixture, and said biasing mechanism causes said guide to push the flexible work piece toward said fixture.

8. The compliant end effector of claim 7, and wherein said stabilizing fixture has a surface and said guide presses the flexible work piece against said surface of said fixture.

9. The compliant end effector of claim 8, and wherein the biasing mechanism is a telescoping cylinder having first and second tubes, and wherein the cylinder has a predetermined internal pressure that biases said first and second tubes into said first biased position, said first tube being movably attached to a second location on said mount, and said second tube being movably attached to a second point on said adjustment assembly, said first and second points of said adjustment assembly being a predetermined distance apart.

10. The compliant end effector of claim 9, and further including means for adjusting said internal pressure in said telescoping cylinder.

11. The compliant end effector of claim 10, and wherein said first point of said adjustment assembly is pivotally attached to said first location of said mount, and said telescoping cylinder pivots said adjustment assembly, guide and tool about said first point of said assembly and through a predetermined range of motion with respect to said mount.

12. The compliant end effector of claim 4, and wherein said end effector is attached to an end of the robot, and wherein rotation of the end of the robot moves said working end of said tool closer to said path of travel of the robot.

13. The compliant end effector of claim 4, and wherein said end effector is attached to an end of the robot, and wherein rotation of the end of the robot moves said working end of said tool away from said path of travel of the robot.

14. The compliant end effector of claim 4, and wherein said adjustment assembly includes a port for releasably securing said guide.

15. The compliant end effector of claim 1, and wherein the work engaging portion of the guide is a roller.

16. The compliant end effector of claim 1, and wherein said tool is a spindle and the working end of said tool is a cutting and trimming device.

17. A compliant end effector attachable to a robot for performing work on a flexible work piece having a predetermined length, the robot being programmed to move along a predetermined path of travel along the length of the work piece, said compliant end effector comprising:

a mount securable to the robot, said mount having first and second locations;

a adjustment assembly having first and second points, said first point being pivotally attached to said first location of said mount;

a guide having a predetermined length and extending from said adjustment assembly in a predetermined direction, said guide being rigidly fixed to said adjustment assembly and having a portion for engaging the flexible work piece responsive to movement by the robot;

a tool having a predetermined length and extending from said assembly in a predetermined direction, said tool being rigidly fixed to said adjustment assembly and having a working end for engaging the work piece, said working end being maintained a constant predetermined distance from said work piece engaging portion of said guide; and, a telescopic cylinder having first and second tubes holding a predetermined internal pressure, said first tube being pivotally attached to said second location of said mount, and said second tube being pivotally attached to said second point of said adjustment assembly, said first and second points of said assembly being a predetermined distance apart, said internal pressure biasing said guide into a first biased position prior to engagement with said work piece, said cylinder permitting said guide to move through a range of biased positions when the robot causes said guide to engage the work piece, said work piece engaging portion of said guide remaining in contact with the work piece as the robot moves along said predetermined path of travel along the length of the work piece.

18. The compliant end effector of claim 17, and wherein the flexible work piece is placed proximal a stabilizing fixture, and said telescoping cylinder causes said work engaging portion of said guide to push the flexible work piece toward said fixture.

19. The compliant end effector of claim 18, and further including means for adjusting said internal pressure in said telescoping cylinder.

20. The compliant end effector of claim 19, and wherein said guide adjustment assembly includes a port for releasably securing said guide.

21. The compliant end effector of claim 17, and wherein said tool is a spindle and the working end of said tool is a cutting and trimming device.

22. The robot of claim 6, and wherein said tool is a spindle and the working end of said tool is a cutting and trimming device.

23. The robot of claim 6, further comprising:

an articulated arm connected to the body and formed of a plurality of segments pivotably connected together in adjacent relationship;

means for pivoting each segment with respect to each adjacent segment.

24. The robot of claim 23, and wherein the guide and tool are rigidly fixed to said adjustment assembly and said working end of said tool remains a constant predetermined distance from said work piece engaging portion of said guide.

25. The robot of claim 24, and wherein the work piece has a predetermined length and the robot is programmed to move along a predetermined path of travel along the length of the work piece, and said biasing mechanism biases said guide against the work piece as the robot moves along said predetermined path of travel and said tool continues to engage the work piece a predetermined distance from said work piece engaging portion of said guide.

26. The robot of claim 25, and wherein said mechanism biases said work engaging portion of said guide into said first predetermined position prior to engagement with the work piece.

27. The robot of claim 23, and further comprising a mount rigidly secured to the arm, said mount having a first location, and said adjustment assembly having a first point movably attached to said first location of said mount.

28. The robot of claim 23, wherein the work piece is flexible, and wherein the flexible work piece is placed proximal a stabilizing fixture, and said biasing mechanism causes said guide to push the flexible work piece toward said fixture.

29. The robot of claim 28, and wherein said stabilizing fixture has a surface and said guide presses the flexible work piece against said surface of said fixture.

30. The robot of claim 29, and wherein the biasing mechanism is a telescoping cylinder having first and second tubes, and wherein the cylinder has a predetermined internal pressure that biases said first and second tubes into said first biased position, said first tube being movably attached to a second location on said mount, and said second tube being movably attached to a second point on said adjustment assembly, said first and second points of said adjustment assembly being a predetermined distance apart.

31. The robot of claim 30, and further including means for adjusting said internal pressure in said telescoping cylinder.

32. The robot of claim 29, and wherein said first point of said adjustment assembly is pivotally attached to said first location of said mount, and said telescoping cylinder pivots said adjustment assembly, guide and tool about said first point of said assembly and through a predetermined range of motion with respect to said mount.

33. The robot of claim 26, wherein said arm is rotatable, and wherein rotation of said robotic arm moves said working end of said tool closer to said path of travel of said robot.

34. The robot of claim 26, wherein said arm is rotatable, and wherein rotation of said robotic arm moves said working end of said tool away from said path of travel of said robot.

35. The robot of claim 26, and wherein said adjustment assembly includes a port for releasably securing said guide.

36. The robot of claim 27, and wherein the work engaging portion of the guide is a roller.

* * * * *